United States Patent
Sethi et al.

(10) Patent No.: US 11,429,711 B2
(45) Date of Patent: Aug. 30, 2022

(54) METHOD AND SYSTEM FOR USER INDUCED PASSWORD SCRAMBLING

(71) Applicant: Dell Products L.P., Round Rock, TX (US)

(72) Inventors: Parminder Singh Sethi, Punjab (IN); Durai S. Singh, Chennai (IN)

(73) Assignee: Dell Products L.P., Round Rock, TX (US)

( * ) Notice: Subject to any disclaimer, the term of this patent is extended or adjusted under 35 U.S.C. 154(b) by 368 days.

(21) Appl. No.: 16/693,972

(22) Filed: Nov. 25, 2019

(65) Prior Publication Data

US 2021/0157899 A1 May 27, 2021

(51) Int. Cl.
| | |
|---|---|
| *G06F 21/46* | (2013.01) |
| *G06F 21/31* | (2013.01) |
| *G06F 16/903* | (2019.01) |
| *H04L 9/40* | (2022.01) |
| *G06F 9/54* | (2006.01) |

(52) U.S. Cl.
CPC ............. *G06F 21/46* (2013.01); *G06F 9/546* (2013.01); *G06F 16/90344* (2019.01); *G06F 21/31* (2013.01); *H04L 63/083* (2013.01)

(58) Field of Classification Search
CPC ......... G06F 21/46; G06F 21/31; H04L 63/083
See application file for complete search history.

(56) References Cited

U.S. PATENT DOCUMENTS

| | | | | |
|---|---|---|---|---|
| 8,200,582 | B1* | 6/2012 | Zhu | G06Q 20/3829 705/64 |
| 9,213,812 | B1* | 12/2015 | Windell | G06F 21/31 |
| 9,946,867 | B1* | 4/2018 | Ramalingam | G06F 21/45 |
| 10,440,007 | B1* | 10/2019 | Ramalingam | G06F 3/0484 |
| 10,521,241 | B1* | 12/2019 | Ha | G06F 21/31 |
| 2012/0023574 | A1* | 1/2012 | Osborn | H04L 9/3226 726/19 |
| 2012/0042364 | A1* | 2/2012 | Hebert | G06F 21/554 726/6 |
| 2017/0134423 | A1* | 5/2017 | Sysman | G06F 21/554 |
| 2018/0089404 | A1* | 3/2018 | Uchida | G06F 3/0488 |
| 2018/0089405 | A1* | 3/2018 | Onishi | G06F 21/84 |
| 2018/0224989 | A1* | 8/2018 | Deasy | G06F 3/0233 |
| 2018/0285550 | A1* | 10/2018 | Zhu | G06F 21/36 |
| 2018/0300464 | A1* | 10/2018 | Mahfouz | G06F 21/316 |
| 2021/0326416 | A1* | 10/2021 | Horne | G06F 21/6218 |

* cited by examiner

*Primary Examiner* — James R Turchen
(74) *Attorney, Agent, or Firm* — Terrile, Cannatti & Chambers; Stephen A. Terrile (57) ABSTRACT

A system, method, and computer-readable medium are provided to protect passwords for computer applications by providing a user-triggered password scrambling mechanism. Scrambling is enabled with a user configurable character within the password to be a trigger. Once triggered, a user can enter several incorrect password strings without fear of being locked out of the system. Ultimately, a user can enter a correct password string or a modified version of the correct password string to gain access to the system. Through password scrambling, an observer will have a more difficult time determining the correct version of the password. This improves system security, thereby protecting valuable information, resources, and reputation of an enterprise provider.

19 Claims, 5 Drawing Sheets

METHOD AND SYSTEM FOR USER INDUCED PASSWORD SCRAMBLING

BACKGROUND OF THE INVENTION

Field of the Invention

The present invention relates to information handling systems. More specifically, embodiments of the invention relate to a mechanism for protecting passwords through a user-induced scrambling to avoid password acquisition through observation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many working environments, individual users of an information handling system work in close proximity, often without physical barriers between them. As a result, chances of a user observing another user's system from close proximity is high. This increases concerns of stolen passwords by coworkers who take notice of passwords as they are being entered.

Unauthorized access to a computer, mobile device, online application, or automated teller machine is a significant problem. Consequences of unauthorized access to such resources can lead to, for example, loss or misappropriation of sensitive or valuable data, loss of money from a bank account, identity theft, and legal issues associated with malicious actions from a user account. Typical methods of securing passwords, such as password manager applications and biometric authentication, are not necessarily usable in all environments, especially where users log onto common computers.

It is therefore desirable to have a mechanism to protect passwords in an environment where direct observation of typing of passwords is possible. It is further desirable for the mechanism to be straightforward to use to remove barriers to protect passwords.

SUMMARY OF THE INVENTION

A system, method, and computer-readable medium are disclosed to protect passwords for computer applications by providing a user-triggered password scrambling mechanism.

In one embodiment, a computer-implementable method for authorizing access to a system is provided, where the method includes storing a user-defined index value corresponding to a character in a stored password string, comparing a first character string with the stored password string, authorizing access to the system if the first character string matches the stored password string, and, if the first character string does not match the stored password string, then permitting entry of N additional character strings for comparison with the stored password string if each character of the first character string matches each corresponding character of the stored password string with an exception of the character at the index value position and if the character at the index value position of the first character string is a single-digit integer value N.

One aspect of the above embodiment further includes authorizing access to the system if a character string of the N additional character strings matches the stored password string after entry of that character string. Another aspect of the above embodiment further includes authorizing access to the system if each character of the $N^{th}$ character string of the N additional character strings matches each corresponding character of the stored password string with the exception of the character at the index value position. Yet another aspect of the above embodiment further includes denying access to the system if any character of the $N^{th}$ character string of the N additional character strings does not match each corresponding character of the stored password string with the exception of the character at the index value position.

Another aspect of the above embodiment further includes storing a user-defined index shift value and index shift frequency value and advancing the index value by the index shift value after a time. Equal to the index shift frequency. A further aspect of the above embodiment further includes providing a current index value in response to a request from an authorized source. In a still further aspect of the above embodiment, the request is provided by a messaging system.

Another embodiment of the present invention provides an application server having restricted access, where the application server includes a memory, a network interface coupled to a network, and a processor coupled to the memory and the network interface. The memory stores a password string, an application, and a user-defined index value corresponding to a character in the password string. The network interface is configured to communicate with a remote network node. The processor is configured to compare a first character string received from the remote network node to the password string, authorize access to execute the application if the first character string matches the password string, and, if the first character string does not match the stored password string, then permit entry of N additional character strings from the remote network node for comparison with the stored password string if each character the first character string matches each corresponding character of the stored password string with an exception of the character at the index value position and if the character at the index value position of the first character string is a single-digit integer value N.

In one aspect of the above embodiment, the processor is further configured to authorize access to execute the application if a character string of the N additional character strings matches the stored password string after entry of that character string. In another aspect of the above embodiment, the processor is further configured to authorize access to execute the application if each character of the $N^{th}$ character string of the N additional character strings matches each corresponding character of the stored password string with the exception of the character at the index value position. In yet another aspect of the above embodiment, the processor is further configured to deny access to execute the application if any character of the $N^{th}$ character string of the N additional character strings does not match each corresponding character of the stored password string with the exception of the character at the index value position.

In another aspect of the above embodiment, the memory further stores a user-defined index shift value and index shift frequency value, and the processor is further configured to advance the index value by the index shift value after a time. Equal to the index shift frequency. In a further aspect, the processor is further configured to provide a current index value in response to a request from an authorized source. In yet a further aspect, the network interface is further configured to communicate with a messaging system, and the request is provided by the messaging system.

Another embodiment provides a non-transitory, computer-readable storage medium embodying computer program code, the computer program code includes computer executable instructions configured for storing a user-defined index value corresponding to a character in a stored password string, comparing a first character string with the stored password string, authorizing access to a system if the first character string matches the stored password string, and, if the first character string does not match the stored password string, then permitting entry of N additional character strings for comparison with the stored password string if each character of the first character string matches each corresponding character of the stored password string with an exception of the character at the index value position and if the character at the index value position of the first character string is a single-digit integer value N.

In one aspect of the above embodiment, the computer executable instructions are further configured for authorizing access to the system if a character string of the N additional character strings matches the stored password string after entry of that character string. In another aspect of the above embodiment, the computer executable instructions are further configured for authorizing access to the system if each character of the $N^{th}$ character string of the N additional character strings matches each corresponding character of the stored password string with the exception of the character at the index value position. In yet another aspect of the above embodiment, the computer executable instructions are further configured for denying access to the system if any character of the $N^{th}$ character string of the N additional character strings does not match each corresponding character of the stored password string with the exception of the character at the index value position. In another aspect of the above embodiment, the computer executable instructions are further configured for storing a user-defined index shift value and index shift frequency value and advancing the index value by the index shift value after a time. Equal to the index shift frequency.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Embodiments of the present invention provide a system, method, and computer-readable medium to protect passwords for computer applications by providing a user-triggered password scrambling mechanism. Scrambling is enabled by providing a user configurable character within the password to be a trigger. Once triggered, a user can enter several incorrect password strings without fear of being locked out of the system. Ultimately, a user can enter a correct password string or a modified version of the correct password string to gain access to the system. Through password scrambling, an observer will have a more difficult time determining the correct version of the password. This improves system security, thereby protecting valuable information, resources, and reputation of an enterprise provider.

User authentication for computer-based systems and applications can be performed in a variety of ways. The most common user authentication methods involve passwords or personal identification numbers (PINs). A password is a user-generated string of letters, digits, or special characters. A PIN is a sequence of digits. Both are used to confirm the identity of a person when successfully presented. Generally, passwords and PINs are selected by users to be easily remembered and easily reproduced. While both passwords and PINs are susceptible to brute force, guessing-type attacks, this is often balanced out by constraining a number of authentication attempts to a small number (e.g., three or four), and then blocking the account if login is failed after that number of attempts.

A common way to gain unauthorized access to a computer system, application, or automated teller machine is by directly observing another user entering a password or personal identification number (PIN) (also known as shoulder surfing). A typical example is an observer who stands behind a computer user who is typing in their password, and the observer looks over the user's shoulder to obtain the password. Current methods for preventing password or PIN theft include, for example, privacy screen protectors that blacken a computer screen for viewers outside a certain viewing angle, biometric identification systems (e.g., fingerprint or facial scanners), shielding a PIN pad or keyboard to prevent observance, situating a computer in a place that avoids cameras or observers, us of optical illusions to alter a perceived keypad for an observer.

Embodiments of the present invention seek to provide a mechanism by which a user can select to obscure their password should they be at risk for shoulder surfing-type attacks or suspect that they are at risk. Embodiments allow the user to configure a setting while defining their password that permits the user to enter any random or incorrect password for a user-defined number of times. This makes it difficult for an observer to discern the actual password. The setting can have three parameters: an index to designate a specific character of the password; an index shift value that can define a number of characters by which the index can be automatically shifted; and, a frequency at which the index will be shifted. In practice, the user enters a string that reflects their password with the character at the index position substituted with a numeric value (n). This causes the system to prompt for the password again (e.g., wrong password entered), and the user can enter any random or incorrect password for the next (n) times without risk of getting locked out. At any time, the user can enter a string that matches the actual password and be granted access. Finally, entering a password string on attempt (n+1) where the index character is replaced by any character, while the rest of the string matches the actual password, will also allow access. By providing all these different password attempts, the observer will be less likely to obtain the correct password.

Figure 1:
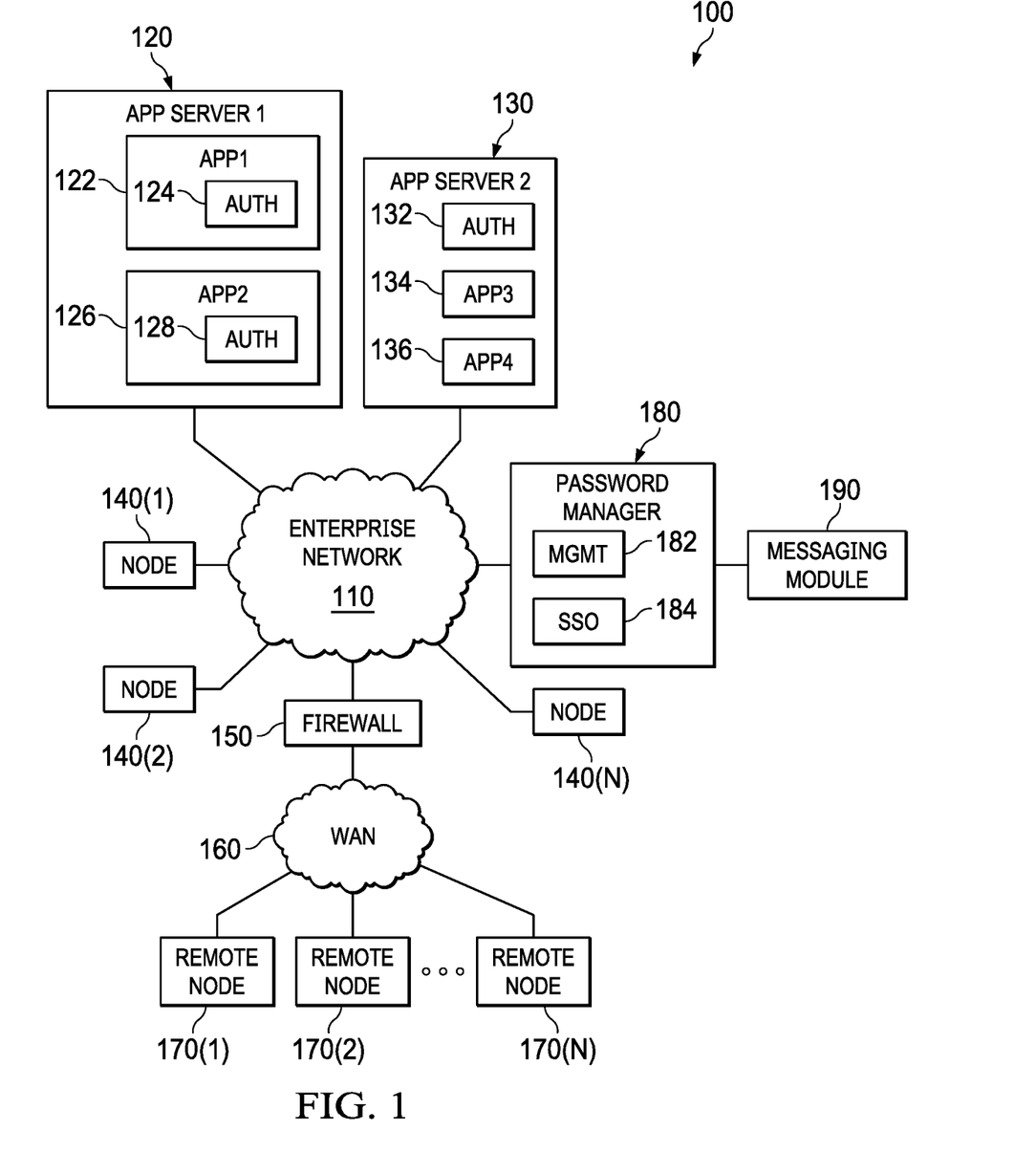
FIG. 1 is a simplified block diagram illustrating an example network environment in which embodiments of the present invention can be configured to operate.

FIG. 1 is a simplified block diagram illustrating an example network environment in which embodiments of the present invention can be configured to operate. An enterprise network 110 is communicatively coupled to application servers 120 and 130. In addition, network nodes 140 (1)-(N) are also coupled to the enterprise network. Enterprise network is coupled to a wide area network (WAN) 160 outside of the enterprise through a firewall 150, which can be a router designed to pass through communication flows from designated or security cleared sources. Remote nodes 170 (1)-(M) are communicatively coupled via WAN 160 and firewall 150 to enterprise network 110.

Network nodes 140(1)-(N) and remote nodes 170(1)-(M) are configured to access application servers 120 and 130 using network protocols appropriate to applications being performed and as implicated by the nature of WAN 160 and enterprise network 110. Through this communication link, application servers 120 and 130 can provide network nodes 140(1)-(N) and remote nodes 170(1)-(M) access to application programs served by the application servers. As illustrated, application server 120 provides access to applications 122 and 126, while application server 130 provides access to applications 134 and 136. Access to each of the applications is controlled by an authorization mechanism requiring a secure password. Each of applications 122 and 126 have an authorization module 124 and 128, respectively. The authorization modules can require a user to provide either a password or a PIN or some other authentication of the user attempting access to the respective application. Application server 130, on the other hand, provides an authorization module that controls access to all the applications resident on that server, thereby providing the convenience of one login to the server for access to all applications. Again, the authorization module can require a user to provide a password, PIN, or other authentication of the user attempting access.

In some enterprise environments, a password manager node 180 can be accessible via enterprise network 110. Password manager node 180 can provide a management module 182 for users to set, change, or otherwise control their password access. In addition, the password manager node can be configured to control access to the enterprise network, and associated servers, through the use of a single sign on module 184. A messaging module 190 can be coupled to, or be provided by, password manager node 180. The messaging module can provide an additional mechanism to communicate with users, such as through SMS text messaging, secure messaging, automatic calling, and the like. Embodiments of the present invention can be incorporated in any of authorization modules 124, 128, and 132, and single sign on module 184.

Figure 2:
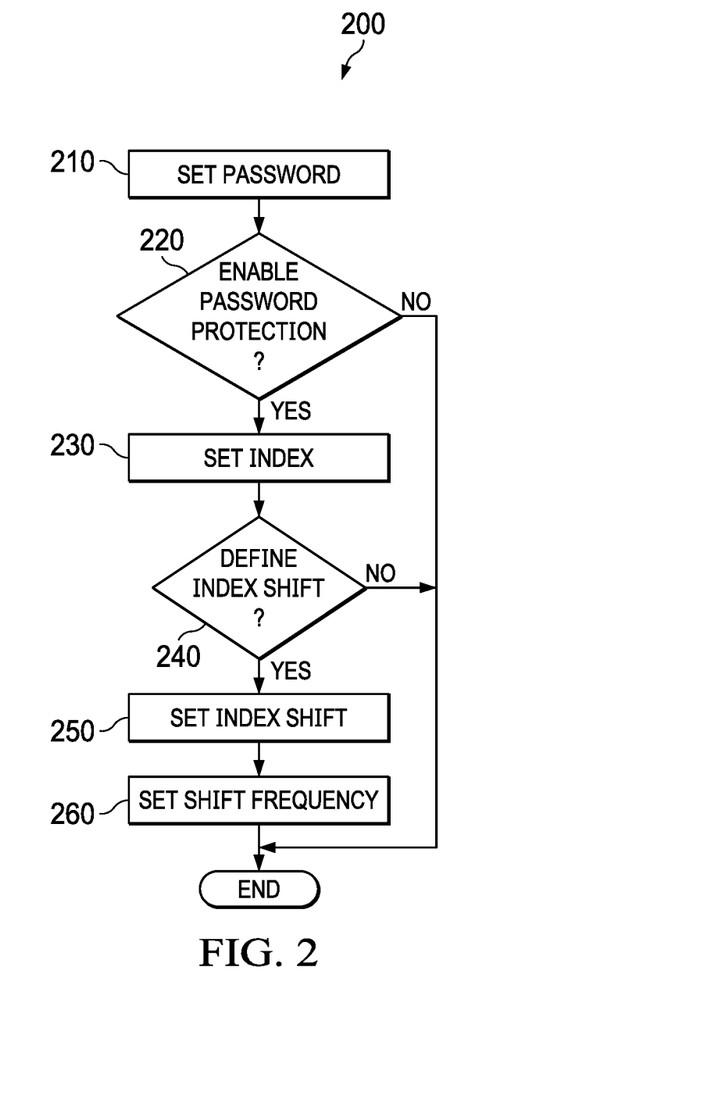
FIG. 2 is a simplified flow diagram illustrating an example configuration flow 200 by which a user can configure settings to enable embodiments of the present invention.

FIG. 2 is a simplified flow diagram illustrating an example configuration flow 200 by which a user can configure settings to enable embodiments of the present invention. In one embodiment, configuration flow 200 is performed during a process by which a user sets their password (210) for use by an application, computer, or network. Once the password has been set, a user can then indicate whether they wish to enable password protection (220). If not, then the flow ends at that point. If the user wishes to enable password protection, then the user can set an index value (230). The index value reflects a specific character of the set password that will, at least initially, be used by embodiments of the present invention. For example, if a password is AbcdE@20 and the index is set to 5, then the user is defining the fifth character, "E", as the index.

In some embodiments, a user can also be given the option to define an index shift during configuration (240). If the user chooses not to define the index shift, then the process can end at that point. If the user chooses to define an index shift, then they can set an index shift value (250). The index shift value defines a number of characters by which an index can be shifted automatically. The purpose of the index shift is to make it more difficult for an observer to guess a password, by changing the character that is used for the index function, as will be discussed more fully below. In addition to setting an index shift value, a user can also set a shift frequency (260). The shift frequency defines the frequency at which an index will be shifted automatically (e.g., two hours or two days). These values can be saved by the authorization module of an application, system, or enterprise along with the associated password for later use by the authorization module in implementing embodiments of the present invention.

Figure 3:
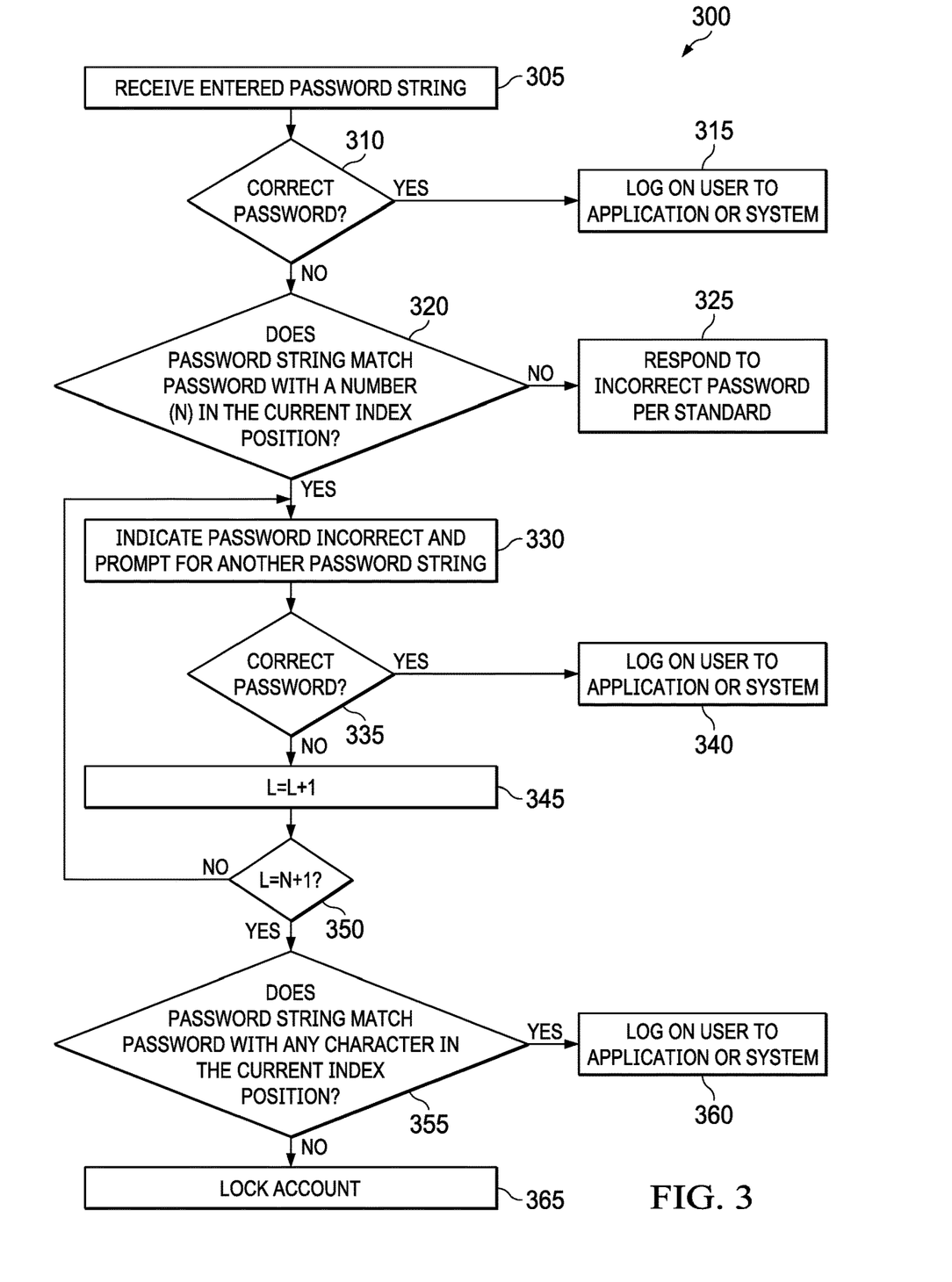
FIG. 3 is a simplified flow diagram illustrating an operational flow 300 executed by authorization modules to implement embodiments of the present invention.

FIG. 3 is a simplified flow diagram illustrating an operational flow 300 executed by authorization modules to implement embodiments of the present invention. During a user authorization stage, and authorization module (e.g., 124, 132, or 184) can prompt a user for a password string to compare against a previously stored actual password associated with that user's account. Passwords can take a variety of forms, including, for example, letters, numbers, special characters, and the like, depending upon the nature of the application, level of security desired, and preferences of system management or the user. The system will receive an entered password string (305) and determine whether that password string matches the actual password (310). If the password string matches the actual password, then the user can be logged on to the associated application, system, or enterprise (315). In a typical system, if the password string did not match the actual password, then a user may be given an opportunity to re-enter a subsequent password string to match the previously entered password. If the user were to fail to match the actual password after a defined number of tries, then the user may be locked out of the system. Embodiments of the present invention provide another option to a valid user that helps to obscure the true value of the actual password without risking being locked out of the system.

The authorization module can determine whether or not the password string matches the actual password but having a number (N) in the current index position (320). If that is not the case, then the authorization module can respond to the incorrect password per a standard procedure such as that mentioned above (325). If the password string does have a number (N) in the current index position, then the system can indicate that the entered password string is incorrect and prompt for another password string (330). This begins a process by which a user can enter a variety of inputs to the password request for (N) iterations in order to obscure the true password from an observer. At any time during this process, a correct password string can be entered and verified (335) and the authorization module can log the user on to the application or system (340). If the password string continues to be incorrect, then the authorization module can track the number of times and incorrect password has been entered (345) until the number of iterations is (N+1) (350).

At the (N+1)$^{th}$ iteration, after the (N+1) password string has been entered, a determination can be made as to whether the entered password string matches the actual password with any character in the current index position (355). If that is the case, then the authorization module can log the user onto the application, system, or enterprise (360) without the user having ever entered a password string that matches the actual password. If the password string does not match the actual password with any character in the current index position, then the authorization module can proceed to lock out the account from access (365), or another operation depending upon the nature of the application and the security level involved.

Figure 4:
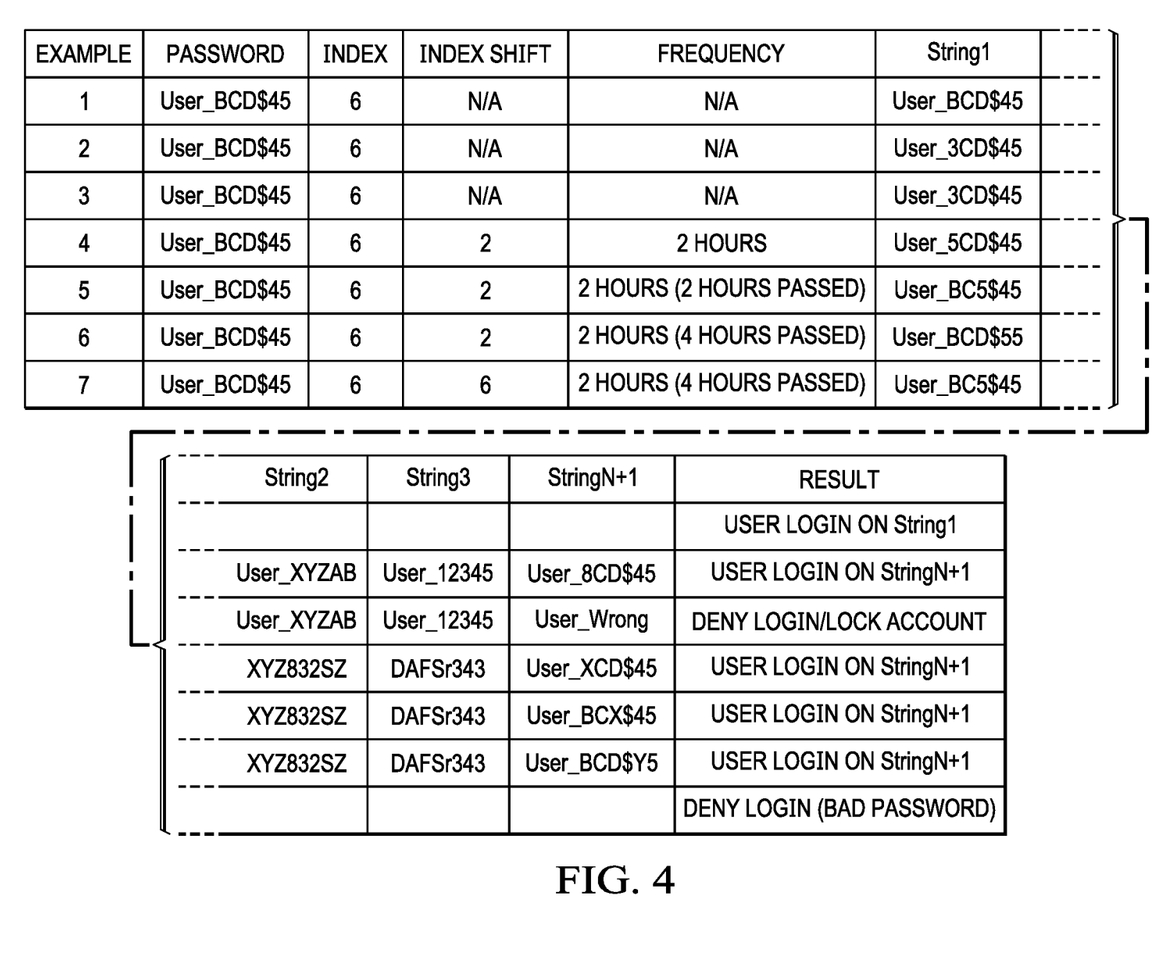
FIG. 4 provides a table illustrating authorization scenarios and results provided by an embodiment of the present invention.

FIG. 4 provides a table illustrating authorization scenarios and results provided by an embodiment of the present invention. In each example provided, an actual password previously stored by an authorization module or password manager is "User_BCD$45". Further, in each example the index value used by the authorization module is 6. Embodiments of the present invention are not restricted to any particular password or index value aside from the defined index value being lower than the number of characters present in the stored password. Each example illustrates one or more password string values provided by a user that are compared to the actual password (e.g., String1, String2, String3, and StringN+1). StringN+1 represents the password string value entered during the (N+1)$^{th}$ iteration, as discussed above.

In Example 1, no index shift or frequency values are defined. A first password string value of "User_BCD$45" is entered, which matches the actual password. This results in a user login after the evaluation of String1.

In Example 2, no index shift or frequency values are defined. A first password string value of "User_3CD$45" is entered and compared to the actual password. Since "3" is entered in the index position 6, the authorization module can receive three additional password strings to be evaluated using embodiments of the present invention. String2 and String3 do not match the stored password. StringN+1 is "User_8CD$45", which provides a value of "8" in the index position. This results in a user login after the evaluation of StringN+1, even though the user did not enter the correct password.

In Example 3, no index shift or frequency values are defined. A first password string value of "User_3CD$45" is entered and compared to the actual password. Since "3" is entered in the index position 6, the authorization module can receive three additional password strings to be evaluated using embodiments of the present invention. String2 and String3 do not match the actual password. In addition, StringN+1 does not match the actual password nor does StringN+1 match the actual password other than the index value. This results in the user being denied login after evaluation of StringN+1 and the account being locked or otherwise secured.

In Example 4, an index shift value of 2 and a frequency of 2 hours is defined. Prior to two hours having passed, a first password string value of "User_5CD$45" is entered and compared to the previously stored password. Since "5" is entered in the index position 6, the authorization module can receive five additional password strings to be evaluated using embodiments of the present invention. String2 and String3 do not match the actual password. StringN+1 is "User_XCD$45", which provides a value of "X" in the index position. This results in a user login after the evaluation of StringN+1.

In Example 5, an index shift value of two and a frequency of two hours is defined, and at least two hours have passed but fewer than four hours. A first password string of "User_BC5$45" is entered and compared to the actual password. Since "5" is entered in the index position 8 (Index+2), the authorization module can receive five additional password strings to be evaluated using embodiments of the present invention. String2 and String3 do not match the actual password. StringN+1 is "User_BCX$45", which provides a value of "X" in the index position. This results in a user login after the evaluation of StringN+1.

In Example 6, an index shift value of two and a frequency of two hours is defined, and at least four hours have passed but fewer than six hours. A first password string of "User_BCD$55" is entered and compared to the actual password. Since "5" is entered in the index position 10 (Index+4), the authorization module can receive five additional password strings to be evaluated using embodiments of the present invention. String2 and String3 do not match the actual password. StringN+1 is "User_BCD$Y5", which provides a value of "Y" in the index position. This results in a user login after the evaluation of StringN+1.

In Example 7, an index shift value of two and a frequency of two hours is defined, and at least four hours have passed but fewer than six hours. A first password string of "User_BC5$45" is entered and compared to the actual password. Since the password string does not match the actual password and the password string does not conform to the indexed text, the user is denied login based on that bad password.

As illustrated in FIG. 4, when an index shift value and frequency have been defined, the index changes over time. If an index shift causes the index to go beyond a length of the stored password, then the index character can shift to the beginning of the stored password string. As time progresses the index can continue to shift from that point.

When using the index shift option, a user may not be able to remember what the current value of the index is. Embodiments provide a mechanism by which a user can send a query message to the enterprise password manager (e.g., password manager node 180) using a text application to a messaging platform (e.g., messaging module 190). An example request could be, for example, "tellmyindex". The enterprise password platform can reply to the requested a predefined way to convey the current index position. This can take the form of a texted clear numerical value, or for greater security, a cryptic sentence that indicates the index value. In this manner, observers who may be able to note the response to the text may still not be able to ascertain the index value. For example, the messaging platform can provide a response using information that only the user will know, such as, "the first digit of the date in your date of birth," "the number of letters in your first child's name," and the like.

An enterprise can configure a messaging platform to perform other desired out-of-band operations to control the index function of embodiments of the present invention. For example, a user can change the index, index shift, and frequency of index shift values, or turn off index shift functionality, or turn off the additional password setting. In such operations, a user can first provide a current index value and then the new information. A format of such a message can be, for example, "CurrentIndex-NewIndex@IndexShift@ShiftFrequency". While messaging applications can be vulnerable to security violations (e.g., hacking), the use of messaging applications does not present an additional security risk to the application, system, or enterprise because a hacker can only get the index but won't be able to gain access to the actual password.

Embodiments of the present invention enable an authentication module to recognize an authentic user without a risk of the user presenting a correct password to an observer. Embodiments provide this by enabling a user to enter random incorrect passwords in the presence of the shoulder surfer and to still be able to access the system. During the course of providing these password strings, a user can decide the number of iterations of the wrong password and can also choose to enter a correct password. A user has the flexibility of the defining a number of times they can enter a random or incorrect password, choosing to change the index auto-matically based on their preference, and the frequency of such changes. In this manner, embodiments protect sensitive or valuable data in systems secured by the method, and prevent other issues associated with stolen authorization codes. For an enterprise, a simple mechanism is provided for preventing breach of user accounts and can save time, money, and other resources spent on identifying a breach of user accounts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 5:
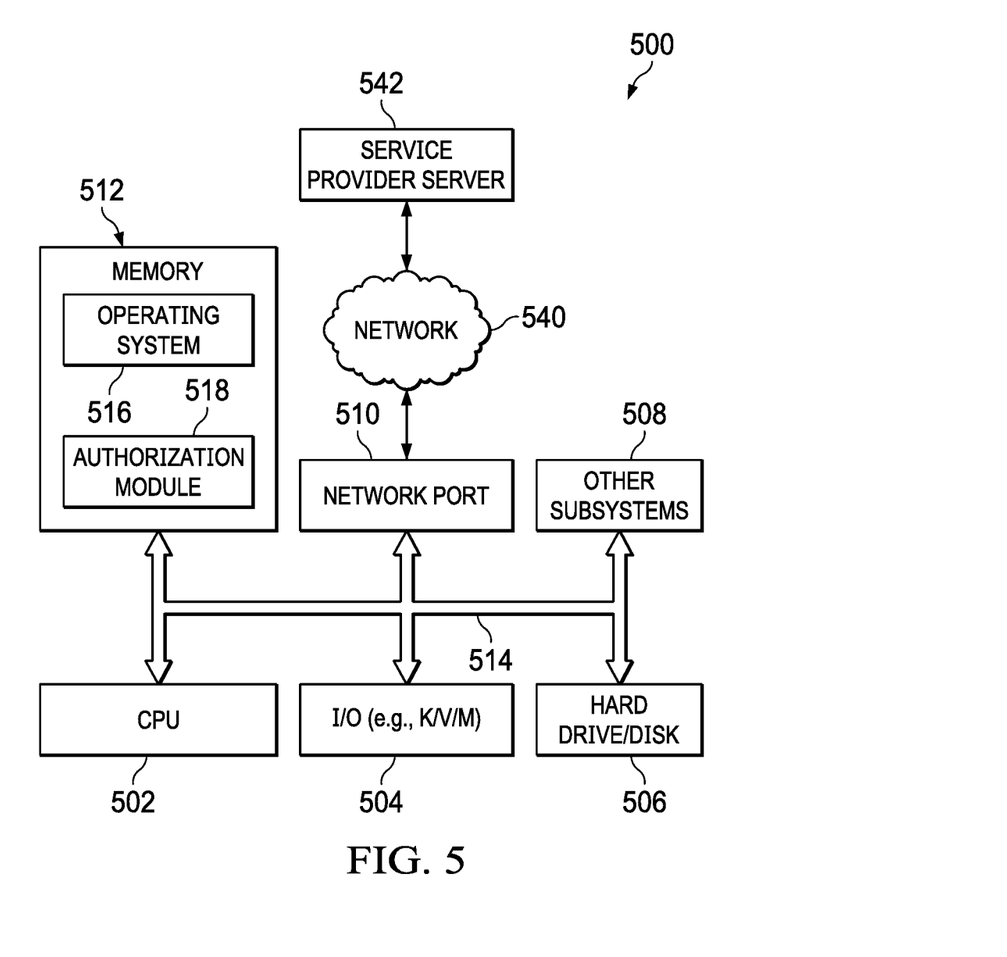
FIG. 5 is a generalized illustration of an information handling system 500 that can be used to implement the system and method of the present invention.

FIG. 5 is a generalized illustration of an information handling system 500 that can be used to implement the system and method of the present invention. The information handling system 500 includes a processor (e.g., central processor unit or "CPU") 502, input/output (I/O) devices 504, such as a display, a keyboard, a mouse, and associated controllers, a hard drive or disk storage 506, and various other subsystems 508. In various embodiments, the information handling system 500 also includes network port 510 operable to connect to a network 540, which is likewise accessible by a service provider server 542 (e.g., application servers 120 and 130). The information handling system 500 likewise includes system memory 512, which is interconnected to the foregoing via one or more buses 514. System memory 512 further comprises operating system (OS) 516 and in various embodiments may also comprise authorization module 518.

As discussed above, authorization module 518 performs the password manipulation operations of embodiments of the present invention. In doing so, security of information handling system 500 is improved by increasing the difficulty of obtaining a user's password through observation.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for authorizing access to a system, the method comprising:
    storing a user-defined index value corresponding to an index value position in a stored password string;
    comparing a first character string with the stored password string;
    authorizing access to the system if the first character string matches the stored password string;
    if the first character string does not match the stored password string, then
        permitting entry of N additional character strings for comparison with the stored password string, when each character of the first character string matches each corresponding character of the stored password string with an exception of a character at the index value position, and when the character at the index value position of the first character string is a single-digit integer value N, wherein the stored password string and the first character string including the exception are the same length.

2. The method of claim 1 further comprising:
    authorizing access to the system if a character string of the N additional character strings matches the stored password string after entry of that character string.

3. The method of claim 1 further comprising:
    authorizing access to the system if each character of the $N^{th}$ character string of the N additional character strings matches each corresponding character of the stored password string with the exception of the character at the index value position.

4. The method of claim 1 further comprising:
    denying access to the system if any character of the $N^{th}$ character string of the N additional character strings does not match each corresponding character of the stored password string with the exception of the character at the index value position.

5. The method of claim 1 further comprising:
    storing a user-defined index shift value and index shift frequency value;
    advancing the index value by the index shift value after a time period equal to the index shift frequency.

6. The method of claim 5 further comprising:
    providing a current index value in response to a request from an authorized source.

7. The method of claim 6, wherein the request is provided by a messaging system.

8. An application server having restricted access, the application server comprising:
    a memory storing a password string, an application, and a user-defined index value corresponding to an index value position in the password string;
    a network interface, coupled to a network, and configured to communicate with a remote network node;
    a processor, coupled to the memory and the network interface, and configured to
        compare a first character string received from the remote network node to the password string,
        authorize access to execute the application if the first character string matches the password string,
        if the first character string does not match the stored password string, then
            permit entry of N additional character strings, from the remote network node, for comparison with the stored password string, when each character of the first character string matches each corresponding character of the stored password string with an exception of a character at the index value position, and when the character at the index value position of the first character string is a single-digit integer value N, wherein the stored password string and the first character string including the exception are the same length.

9. The system of claim 8, wherein the processor is further configured to authorize access to execute the application if a character string of the N additional character strings matches the stored password string after entry of that character string.

10. The system of claim 8, wherein the processor is further configured to authorize access to execute the application if each character of the $N^{th}$ character string of the N additional character strings matches each corresponding character of the stored password string with the exception of the character at the index value position.

11. The system of claim 8, wherein the processor is further configured to deny access to execute the application if any character of the $N^{th}$ character string of the N additional character strings does not match each corresponding character of the stored password string with the exception of the character at the index value position.

12. The system of claim 8, wherein
    the memory further stores a user-defined index shift value and index shift frequency value; and
    the processor is further configured to advance the index value by the index shift value after a time period equal to the index shift frequency.

13. The system of claim 12 wherein the processor is further configured to provide a current index value in response to a request from an authorized source.

14. The system of claim 13, wherein:
the network interface is further configured to communicate with a messaging system; and
the request is provided by the messaging system.

15. A non-transitory, computer-readable storage medium embodying computer program code, the computer program code comprising computer executable instructions configured for:
storing a user-defined index value corresponding to an index value position in a stored password string; comparing a first character string with the stored password string;
authorizing access to a system if the first character string matches the stored password string;
if the first character string does not match the stored password string, then
permitting entry of N additional character strings for comparison with the stored password string, when each character of the first character string matches each corresponding character of the stored password string with an exception of a character at the index value position, and when the character at the index value position of the first character string is a single-digit integer value N, wherein the stored password string and the first character string including the exception are the same length.

16. The non-transitory, computer-readable storage medium of claim 15, wherein the computer executable instructions are further configured for:
authorizing access to the system if a character string of the N additional character strings matches the stored password string after entry of that character string.

17. The non-transitory, computer-readable storage medium of claim 15, wherein the computer executable instructions are further configured for:
authorizing access to the system if each character of the $N^{th}$ character string of the N additional character strings matches each corresponding character of the stored password string with the exception of the character at the index value position.

18. The non-transitory, computer-readable storage medium of claim 15, wherein the computer executable instructions are further configured for:
denying access to the system if any character of the $N^{th}$ character string of the N additional character strings does not match each corresponding character of the stored password string with the exception of the character at the index value position.

19. The non-transitory, computer-readable storage medium of claim 15, wherein the computer executable instructions are further configured for:
storing a user-defined index shift value and index shift frequency value;
advancing the index value by the index shift value after a time period equal to the index shift frequency.

\* \* \* \* \*